United States Patent
Lamarche et al.

(10) Patent No.: US 7,439,638 B2
(45) Date of Patent: Oct. 21, 2008

(54) ELECTRONIC PROXIMITY SWITCHING DEVICE

(75) Inventors: Jean-Luc Lamarche, Mittelhausbergen (FR); Manfred Strobel, Weingarten (DE)

(73) Assignee: i f m electronic GmbH, Essen (DE)

( * ) Notice: Subject to any disclaimer, the term of this patent is extended or adjusted under 35 U.S.C. 154(b) by 311 days.

(21) Appl. No.: 10/953,065

(22) Filed: Sep. 30, 2004

(65) Prior Publication Data

US 2005/0146229 A1    Jul. 7, 2005

(30) Foreign Application Priority Data

Sep. 30, 2003   (DE) .................. 103 45 819

(51) Int. Cl.
*H01H 85/46* (2006.01)
*H02H 11/00* (2006.01)
(52) U.S. Cl. ...................... 307/326; 307/116
(58) Field of Classification Search ................ 307/116, 307/326
See application file for complete search history.

(56) References Cited

U.S. PATENT DOCUMENTS 3,898,472 A * 8/1975 Long .................. 180/270
4,917,199 A * 4/1990 Loshbough .............. 177/210 C
7,132,766 B2 * 11/2006 Gasperi et al. ............. 307/116

OTHER PUBLICATIONS

DIN EN 954-1, Mar., 1997, pp. 1-21.
BIA-Report Jun. 1997.

* cited by examiner

*Primary Examiner*—Michael J Sherry
*Assistant Examiner*—Michael Rutland Wallis
(74) *Attorney, Agent, or Firm*—David S. Safran

(57) ABSTRACT

An electronic switching device, which operates without contact, includes a single sensor element (1), a clock generator, which can be provided internally or which can be connected externally, an evaluation circuit (2), and an electronic or electromechanical switch (3), which is provided on an output side. The evaluation circuit (2) includes diversity processing units (4, 5), and a checking unit (6), wherein an output signal of the sensor element (1) is delivered in succession to the processing units (4, 5), and that output signals of the processing units (4, 5) are checked for consistency by the monitoring unit (6). Advantageously, with only a single sensor element (1), category 4 of EN 954-1 or safety level SIL 3 of EN 61508 requirements can be achieved.

8 Claims, 2 Drawing Sheets

ELECTRONIC PROXIMITY SWITCHING DEVICE

BACKGROUND OF THE INVENTION

1. Field of the Invention

The invention relates to an electronic switching device, which operates preferably without contact, and includes a sensor element, a clock generator, which can be provided internally or which can be connected externally, an evaluation circuit, and an electronic or electromechanical switch, which is provided on an output side.

2. Description of Related Art

Electronic switching devices of the type under consideration are often so-called proximity switches, which therefore operate without contact. Such switching devices can indicate whether an influencing element to which the corresponding proximity switch is sensitive has approached the proximity switch closely enough. If an influencing element has approached the proximity switch closely enough, a sensor element, via an evaluation circuit, reverses a switch, which is provided on an output side. In the case of a switching device having a make contact, the electronic switch, which is initially nonconductive, becomes conductive. In the case of a switching device having a break contact, the electronic switch, which is initially conductive, is configured for blocking. With such switching devices, whether a physical quantity of an influencing medium to which the switching device is sensitive has reached a corresponding value also can be indicated. Such electronic switching devices can also include an internal operating voltage supply circuit for making available the internally required operating voltage (i.e., internal operating voltage).

Often electronic switching devices are configured as inductive proximity switches. In this case, the sensor element is generally a tuned circuit, which includes a tuned circuit inductance, a tuned circuit capacitance, and which can be influenced by a metallic influencing element. Influencing by the metallic influencing element, then can lead to attenuation and/or to a change of the resonant frequency of the tuned circuit. Often, the damping of the tuned circuit is evaluated; but a change of the resonant frequency of the tuned circuit can also be evaluated.

The machine guideline of the European Union for certain applications of electronic switching devices requires protective measures. Such protective measures, among others, require adherence to certain standards. One such standard is EN 954-1, which was adopted after almost eight years of work, and is entitled "Safety of machinery—Safety-relevant parts of controls, Part 1: General Configuration Principles." The heart of EN 954-1 is the establishment of five categories for safety-relevant parts of machine controls and protective devices. These categories can be used independently of the application and the control technology used, and can simply be oriented toward the existing risk, which proceeds from the machine. In categories B and 1, the resistivity to faults is achieved largely by use of suitable components to address failure. However, when a fault occurs, the safety function can be ineffective. Category 1, as compared to category B, has a higher resistivity to faults by using special components, which are proven in safety engineering. In categories 2, 3 and 4, improved efficiency with respect to the stipulated safety function is achieved largely by structural measures. In category 2, the execution of the safety function is checked at regular intervals (generally automatically by technical means). Between the test phases, however, when a fault occurs, the safety function can fail. By suitable selection of the test intervals when using category 2, a suitable risk reduction can be achieved. In categories 3 and 4, the occurrence of an individual fault cannot lead to loss of the safety function. In category 4, and whenever feasible in an appropriate manner in category 3, these faults are automatically detected. In category 4, moreover, there is resistivity to the accumulation of unnoticed faults.

Regarding what has been stated above with respect to EN 954-1, reference is made to the BIA Report 6/97 "Categories for safety-relevant controls according to EN 954-1," published by the General Federation of Professional Associations (ISBN: 3-88383-445-9; ISSN: 0173-0387). There also is EN 60947-5-3 for sensors and for switching devices. This standard differentiates between safety levels PDF-D, PDF-T, PDF-S, and the highest safety level PDF-M.

In a new standard, EN 61508, there are SIL categories, specifically SIL 1 to SIL 4 (SIL=Safety Integrity Level). Category SIL 3 corresponds roughly to category 4 of EN 954-1. In order to reach these safety levels, fault management measures must be implemented. This is achieved by employing an appropriate structure. Category 4 of EN 954-1, which corresponds essentially to SIL 3, can be implemented essentially only with a redundant/diversity structure. Such structure has always been implemented in the prior art only with two sensor elements, often called "elementary sensors," which is a complex and consequently a costly manner of implementation.

SUMMARY OF THE INVENTION

With consideration of the problems with the related art, an object of the invention is to provide an electronic switching device, which preferably operates without contact, and includes a single sensor element for achieving category 4 of EN 954-1 or safety level SIL 3 requirements.

An exemplary electronic proximity switching device, in which the aforementioned and other objects are achieved, includes an evaluation circuit that has diversity processing units and a monitoring unit, wherein an output signal of a sensor element is delivered in succession to the processing units, and the output signals of the processing units are checked in their consistency by a monitoring unit.

Because in the exemplary electronic proximity switching device the output signal of the sensor element is delivered in succession, for example, time division multiplexed, to the processing units, and the output signals of the processing units are checked in their consistency by the monitoring unit, possible faults in the processing units can be immediately detected.

In the exemplary electronic proximity switching device, the monitoring unit can directly trigger the electronic or electromechanical switch, which is provided on the output side. In this case, the monitoring unit can trigger the switch provided on the output side, placing the switch in a conductive state, when and only when the monitoring unit has detected that the output signals of the processing units are consistent.

The exemplary electronic proximity switching device can be configured with the monitoring unit having an assigned a checking unit, which checks the operation of the monitoring unit. In this case, the checking unit can also check whether the monitoring unit is correctly switching over the output of the sensor element.

The safety of the exemplary electronic proximity switching device can be further increased by periodically monitoring or checking the serviceability of the switch, provided on the output side, by the monitoring unit and/or by the checking unit. In this case, all the components, parts, and/or modules of the exemplary electronic proximity switching device are continuously monitored and checked, including the sensor element, the processing units downstream of the sensor element, the monitoring unit itself, and the switch provided on the output side. In this case, the actual monitoring of the monitoring unit takes place when the monitoring means is serviceable, such that the monitoring means can ascertain the consistency of the output signals of the processing units.

If a checking means for checking the operation of the monitoring unit is included in the exemplary electronic proximity switching device, on the output side thereof are provided two series-connected switches, wherein one switch is triggered by the monitoring means, and the other switch is triggered by the checking means. In this case, the output of the switching device is only conductive when the two series-connected switches are controlled to be conductive, wherein both the monitoring means, as well as the checking means make available an output signal, which conductively controls the respective switch.

Otherwise, during the time interval of checking of the processing unit, switching of the output signal of the processing unit or another processing unit to one of the two switches, which are provided on the output side, is performed.

In the case of the exemplary electronic proximity switching device configured as an inductive proximity switch, the sensor element, generally being a tuned circuit, includes a tuned circuit inductance, and a tuned circuit capacitance, and can be influenced by a metallic influencing element. In such an exemplary embodiment, the output signal of the sensor element is switched over by switching the input of one processing unit and the input of the other processing unit to ground in an alternating manner.

The exemplary embodiments include a host of possibilities for embodying and developing the exemplary electronic proximity switching device, wherein reference is made to the appended claims, and to the following description of the exemplary embodiments in conjunction with the drawings.

DETAILED DESCRIPTION OF THE INVENTION

Figure 1:
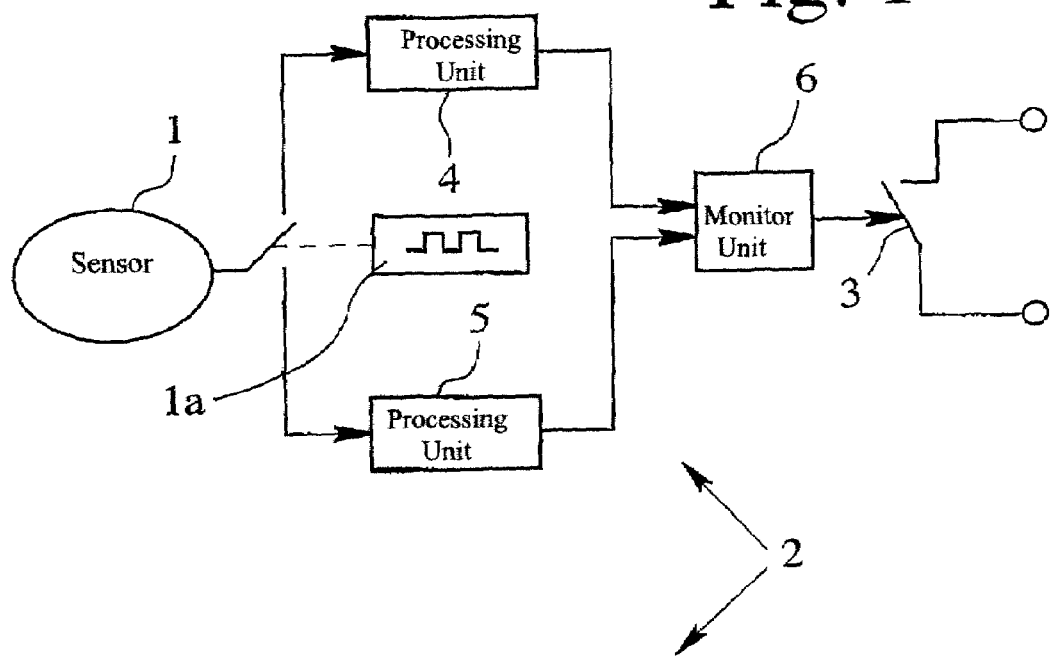
FIG. 1 shows a block diagram of a first exemplary embodiment of an electronic switching device.
Figure 2:
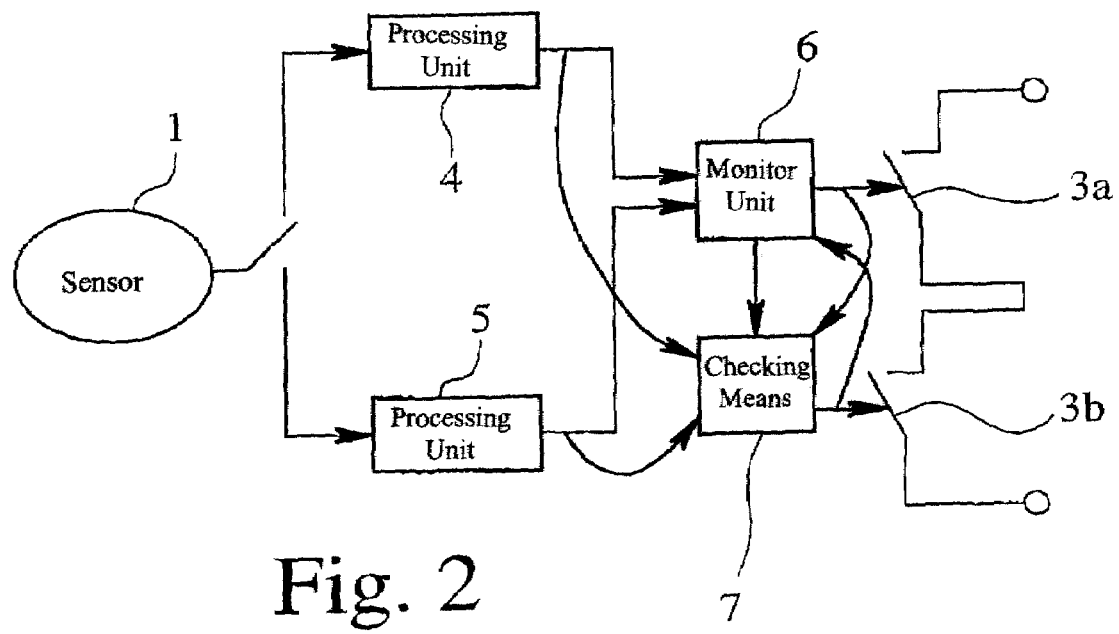
FIG. 2 shows a block diagram of a second exemplary embodiment of an electronic switching device.
Figure 3:
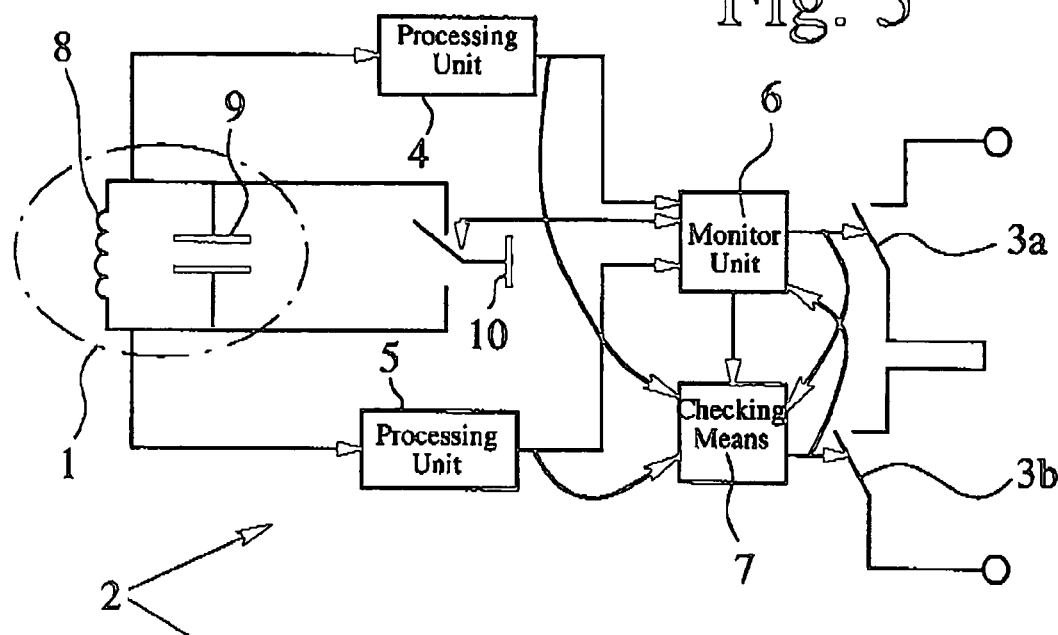
FIG. 3 shows a block diagram of a third exemplary embodiment of an electronic switching device.
Figure 4:
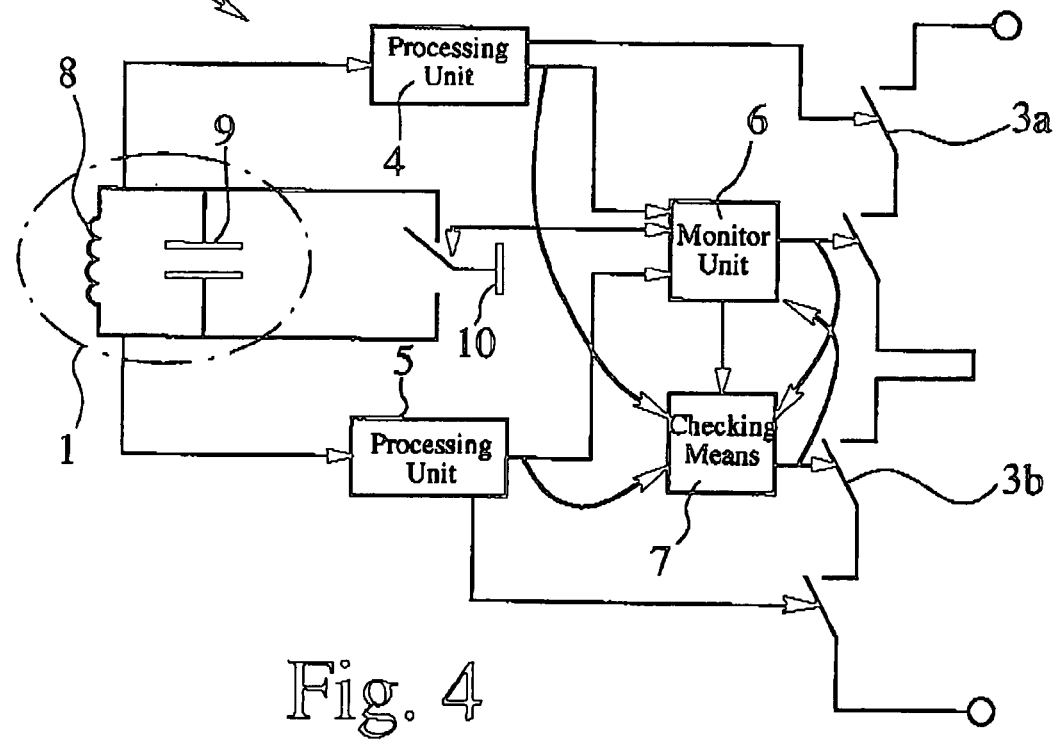
FIG. 4 shows a block diagram of a fourth exemplary embodiment of an electronic switching device.

The exemplary switching devices, without a contact, are shown schematically in FIGS. 1 to 4. The exemplary devices can include inductive, capacitive, or optoelectronic proximity switches or flow indicators, wherein the exemplary embodiments shown in FIGS. 3 and 4 are directed to inductive proximity switches.

The exemplary switching devices include, as necessary for operation, one and only one sensor element 1, a clock generator 1a, which can be provided internally or which can be connected externally, an evaluation circuit 2, and an electronic or electromechanical switch 3, which is provided on the output side. The switch 3 is shown as an electromechanical switch, but can be configured as an electronic switch.

The exemplary electronic switching devices include the evaluation circuit 2, which has diversity processing units 4, 5, and a monitoring unit 6. The output signal of the sensor element 1 is delivered in succession to the processing units 4, 5, and the output signals of the processing units 4, 5 are checked in their consistency by the monitoring unit 6. Because in the exemplary electronic switching devices the output signal of the sensor element 1 is delivered in succession, for example, time division multiplexed, to the processing units 4, 5, and the output signals of the processing units 4, 5 are checked in their consistency by the monitoring unit, possible faults in the processing unit 4 and/or the processing unit 5 can be immediately detected.

In the exemplary electronic proximity switching devices, the processing units 4, 5 can be made quite differently, for example, depending on how the sensor element 1 is made, and/or depending on when the switching device is to respond. Preferably one component of the processing units 4, 5 is a trigger (not shown), which responds when the output signal of the sensor element 1 exceeds or falls below a given, or adjustable threshold value.

In the exemplary electronic switching device shown in FIG. 1, the monitoring unit 6 triggers the switch 3, which is provided on the output side, when and only when the monitoring means 6 has detected the consistency of the output signals of the processing units 4, 5.

In the exemplary electronic switching devices shown in FIGS. 2 to 4, the monitoring unit 6 is assigned a checking unit 7, which checks the operation of the monitoring unit 6. The checking unit 7 also checks whether the monitoring unit 6 is correctly switching over the output of the sensor element 1. In the exemplary electronic switching devices, the serviceability of the switch, which is provided on the output side, is periodically monitored and checked by the monitoring means and/or by the checking means.

In the exemplary electronic switching devices shown in FIGS. 2 to 4, on the output side there are two series-connected switches 3a and 3b, wherein the switch 3a is triggered by the monitoring unit 6, and the switch 3b is triggered by the checking unit 6. In these exemplary embodiments, the output of the switching device is altogether only conductive when the two series-connected switches 3a and 3b are controlled to be conductive, wherein both the monitoring means 6, as well as the checking means 7 make available an output signal, which conductively controls the switch 3a and the switch 3b.

In the exemplary electronic switching devices shown in FIGS. 3 and 4, the sensor element 3 is configured as a tuned circuit having a tuned circuit inductance 8, and a tuned circuit capacitance 9. As is shown in FIGS. 3 and 4, the output signal of the sensor element 1, therefore, of the tuned circuit, is switched over by the input of the processing unit 4, and the input of the processing unit 5 being switched to ground 10 in an alternating manner.

In the exemplary electronic switching devices shown in FIGS. 1 to 4, although only a single sensor element 1, also called an elementary sensor, is provided, advantageously, category 4 of EN 954-1 or safety level SIL 3 requirements can still be implemented.

What is claimed is:

1. An electronic switching device, which operates without contact, comprising:
    a single electronic sensing arrangement having only a single means for producing a sensing output signal;
    a clock generator;
    an evaluation circuit; and
    an electronic or electromechanical switch provided on an output side,
    wherein the evaluation circuit includes diversity processing units, and a monitoring unit, the electronic sensing arrangement being connected so as to deliver said output signal in succession to the processing units, and wherein the monitoring unit is connected so as to be able to check output signals of the processing units for consistency.

2. The electronic switching device of claim 1, wherein the monitoring unit is adapted for controlling the switch provided on the output side into a conductive state when and only when the monitoring unit has detected the consistency of the output signals of the processing units.

3. The electronic switching device of claim 1, further comprising a checking unit assigned to the monitoring unit, and which is adapted for checking operation of the monitoring unit.

4. The electronic switching device of claim 3, wherein the checking unit is adapted for checking whether the monitoring unit is correctly switching over an output of the electronic sensing arrangement.

5. The electronic switching device of claim 3, wherein at least one of the monitoring unit and the checking unit is adapted for periodically monitoring and checking serviceability of the switch provided on the output side.

6. The electronic switching device of claim 3, further comprising series-connected switches on the output side, wherein one switch is triggered by the monitoring unit, and the another switch is triggered by the checking unit.

7. The electronic switching device of claim 6, wherein in a time interval during which the processing unit is checked, the output signal of one of the processing units is switched to one of the switches provided on the output side.

8. The electronic switching device of claim 1, wherein the electronic sensing arrangement is configured as a tuned circuit having a tuned circuit inductance, and a tuned circuit capacitance, an output signal of the sensor element is switched over by an input of one of the processing units, and an input of another of the processing units is switched to ground in an alternating manner.

* * * * *